United States Patent Office 2,798,331
Patented July 9, 1957

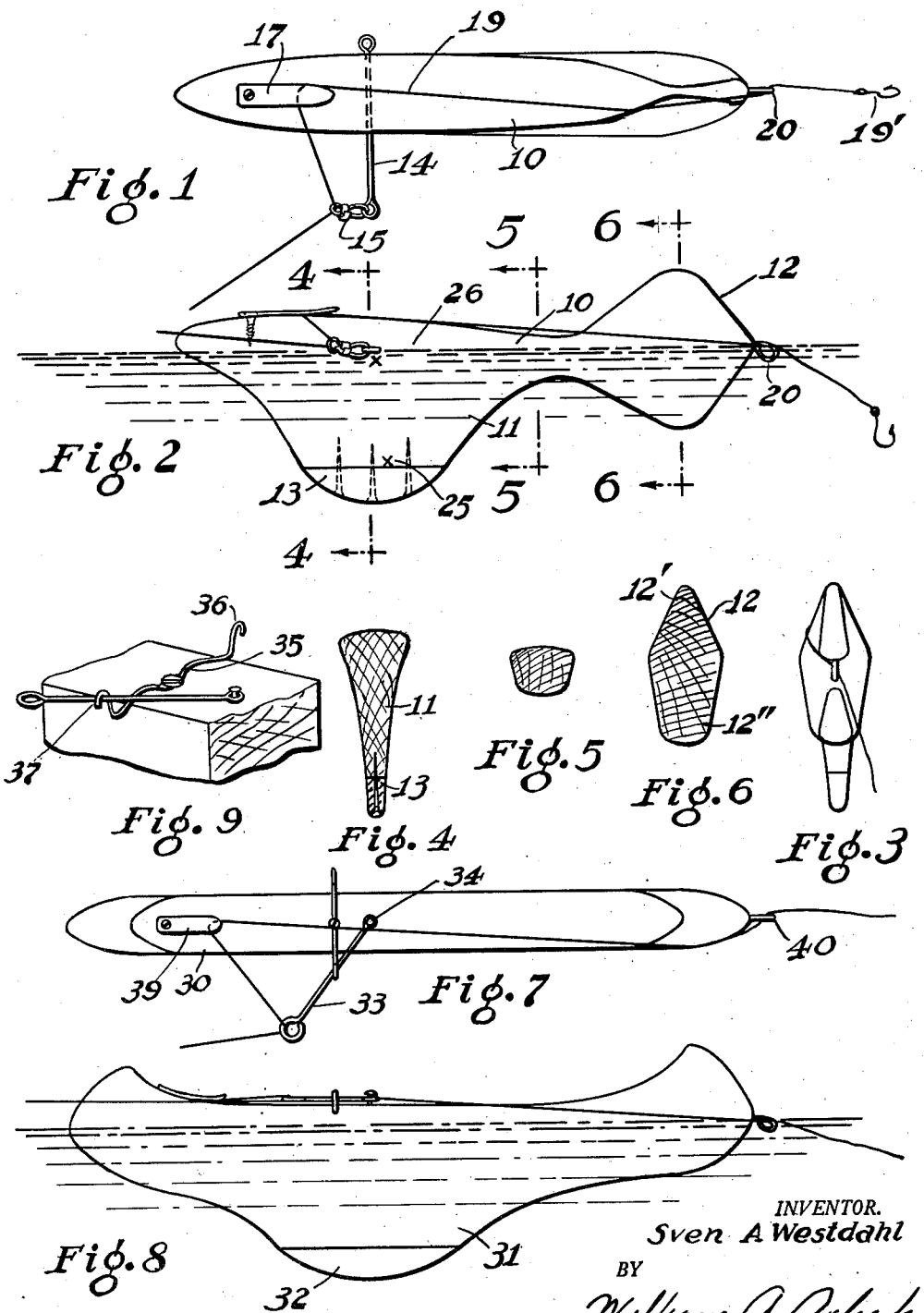

2,798,331

TROLLING FLOAT

Sven A. Westdahl, Union, N. J.

Application June 30, 1952, Serial No. 296,337

6 Claims. (Cl. 43—43.13)

My invention relates to fishing devices, more particularly to improved trolling floats.

In many cases it is difficult to place a float with a line attached thereto in a desired position in a stream or lake or beside a boat but outside of the wake when trolling. Casting may not be possible because of overhanging branches or cramped quarters. Currents may make it impossible to maintain the float in the stream at a distance from the shore. It is also difficult, if not impossible, to troll while walking along the shore of a lake or the bank of a river with a conventional float arrangement or with trolling devices current available. With these devices, while a line may be fixed so as to hang at a predetermined depth, where the length of line is long, if a fish is caught it is impossible to reel in the line since when the float reaches the end of the rod, hand lining must then be resorted to. This causes loss of many fish which would otherwise be caught. Attempts have been made in the past to provide trolling devices with keels which can be guided into a current or beside a boat for fishing purposes, but in these devices the above difficulties are present and no convenient means is provided for changing the line from one side to the other conveniently when shifting from one side of the boat to the other, or when changing direction while moving along the shore line. Other difficulties encountered have been improper design, the float lying low in the water so that nibbles or strikes have been hard to detect prior to actually setting a hook in the mouth of the fish. Other difficulties have resulted from improper design of the trolling device so that control is difficult.

It is, therefore, an object of my invention to provide an improved trolling device so constructed that it may be utilized to carry a line out into a stream or lake and maintain it there either while the fisherman remains in one position or trolls in either direction from a shore line.

It is another object of my invention to provide such a device which can be used for trolling but which nevertheless can travel parallel to a moving boat a distance out but still not be in the wake of the boat.

It is a still further object of my invention to provide such a device which will automatically carry a line or lines some distance from a moving boat or from the shore or bank and act both as a trolling device and as a float.

A still further object of my invention is to provide such a device in which the direction of motion can be easily reversed or sides changed by providing means for readily transferring the line from one side of the device to the other.

A further object of my invention is to provide a device of the kind described which will not only act as a trolling device but which will satisfy the requirements of a bobber.

A still further object of my invention is to provide a device in which the line may be releasably secured to a trolling device while trolling or still fishing but in which the line is automatically released so that the line can be fully reeled in when a fish is caught.

A still further object of my invention is to provide a device of the kind described which has optimum design characteristics for trolling as well as bobbing and for providing ease of control.

In accordance with my invention I provide a combined trolling and bobbing device comprising an elongated body member, one portion of which is provided with a deep riding weighted keel for obtaining a guiding action for carrying the device out into a stream or parallel to a boat and a rear or float portion acting as a bobber. An outrigger is provided toward the front end of the device, preferably slightly less than one third the distance from one end by which the device may be maneuvered into a stream by the current or by walking or by trolling from a boat. A releasable spring-like member mounted at the forward end of the device releasably engages the line which extends through a rear eyelet from which the line extends to the desired length and which carries the hook and bait. The outrigger is provided with a clip so that the line may be switched from one side of the device to the other when it is desired to reverse the direction.

In a modification an outrigger may be pivoted to obtain the same result.

In accordance with my invention the device is so designed that the center of gravity and the center of buoyancy are vertically in line and preferably not more than one-third the distance from the front end of the device with the center of gravity of the device being between one-fourth and one-fifth of the height of the device from the bottom of the device, the center of buoyancy at or near the waterline when the device is floating.

The novel features which I believe to be characteristic of my invention are set forth with particularity in the appended claims, but the invention itself will best be understood by reference to the following description taken in connection with the accompanying drawing in which:

Fig. 1 is a plan view of one form of trolling device and bobber made according to my invention;

Fig. 2 is a side elevation view of the device shown in Fig. 1;

Fig. 3 is a rear end view of the device shown in Fig. 2;

Figs. 4, 5, and 6 are vertical sections taken along lines 4—4, 5—5, 6—6 of Fig. 2;

Fig. 7 is a plan view of a modification of a device made according to my invention; and Fig. 8 is a side elevation of the device shown in Fig. 7.

Fig. 9 shows a perspective detail of the outrigger used in the modification shown in Figs. 7 and 8.

Referring to the drawing, in Fig. 1, a device made according to my invention includes an elongated buoy member 10 having a dirigible shape, contour or outline. The device comprises two sections, a forward section 11 carrying a deep keel which provides the action for carrying the device out into a stream or parallel to a boat, and a rear portion 12 providing a proper shape and form for a bobber.

The device is provided with an outrigger 14 which is frictionally slidable through the body. Mounted at one end is a releasable clip 15 through which the line 19 may be threaded. Mounted on the top of the keel section of the device is spring clip 17 contacting the body and which releasably engages line 19 as shown, the line passing through a rear eyelet 20, the length of line being whatever desired to the bait or hook 19'.

In accordance with my invention I have found that for optimum results the keel portion 11 should comprise approximately two-thirds the length of the body and the bobber portion one-third. I have also found that if the center of buoyancy 26, which is the center of gravity of the body without heavy keel 13 secured thereto, and the center of gravity 25 with the keel secured are in line and approximately one-third the distance from the front end of the body with the body so designed that the center of buoyancy is approximately at the waterline, the best action from my device results. With the arrangement shown the device sits well in the water and the resultant forces which act upon the trolling device insure that it quickly moves out into a stream or parallel to a boat and maintains its position with stability. I have also found that the center of gravity for optimum results should be from one-fourth to one-fifth the distance from the bottom of the keel to the top of the device.

I have also found that for the bobber portion the body should have a wider transverse section along its mid-portion with respect to height than the forward portion so that it rides high with about half the bobber portion above waterline. In this way when the fish nibbles, the bobber action can be easily seen and the bobber not pulled beneath the surface quickly which would hide the attack by the fish. Transverse section for optimum results are shown in Figs. 4 to 6, inclusive, and a device so designed will produce optimum results.

When the hook is set in the fish's mouth and the line jerked, clip 17 automatically releases the line and the device is then free to ride along the line while the line is retrieved. The trolling device moves down toward the hook and fish so that the line can be completely retrieved. The fish is not lost by inability to rapidly retrieve the line and bring it in close to the boat for netting.

It is obvious that if the direction of travel of the fisherman is reversed, of if the device is moved to the opposite side of the boat, the line must be secured to the opposite end of the outrigger. By utilizing a spring clip, such as 15, the line may be readily switched from one side of the outrigger to the other.

The operation of the device is substantially like that of a sailboat tacking in the wind, except that it relies for operation upon resultant forces of the water by movement of the trolling device or by currents in the stream.

In Figs. 7 and 8 I show a modification of the device shown in Figs. 1 to 6, inclusive. Elongated body member 30 is provided with outrigger 33 pivoted at 34, it being maintained in either of two positions by means of spring clip 35 having hook members or loops 36 and 37. Clip 39 engages the line in a manner as described above and in all other respects except for the shape of the device, the same principles apply with respect to center of buoyancy, center of gravity and like features.

My invention is set forth in the appended claims.

What I claim as new is:

1. A trolling float including an elongated body portion of two sections including a forward section carrying a deep keel and a rear section providing a bobber, said forward section comprising approximately two-thirds the length of said device and having a center of gravity between one-fifth and one-fourth the height of said forward section and not more than one-third the distance from the front end of said body portion, said forward section tapering transversely of its longitudinal axis from a wider to a narrower transverse dimension and being weighted at its narrower portion, said bobber section being wider at its mid-portion than the midportion of the forward section and having less height than said forward section, said body member including an outrigger mounted thereon and movable with respect to said body to engage a line on either side thereof and having means for slidably receiving a line and a spring clip mounted on the top of said body adjacent said outrigger, said spring clip and outrigger engaging a line attached to said float, said spring clip being adapted to frictionally engage said line for automatically releasing said line when a predetermined force is applied thereto.

2. A trolling float including an elongated body including a portion carrying a deep keel, said body being tapered transversely of its longitudinal axis from a wider to a narrower transverse dimension and being weighted at its narrower portion by said keel, said body including an outrigger mounted thereon and movable with respect thereto for engaging a line on either side of said body and having means for slidably receiving a line, and a spring clip mounted on the top of said body adjacent said outrigger, said spring clip and outrigger engaging a line attached to said float, said spring clip being adapted to frictionally engage said line for automatically releasing said line when a predetermined force is applied thereto said float comprising a two section body including a forward section carrying said keel and a rear section comprising a bobber having a comparatively wider transverse section than the mid-portion of the forward section and having less height than the forward section carrying said keel, whereby said bobber section rides high in the water and can easily be seen.

3. A trolling float including an elongated body portion of two sections including a forward section carrying a deep keel and a rear section providing a bobber, said forward section comprising approximately two-thirds of the length of said float, said forward section tapering transversely of its longitudinal axis from an upper wider to a lower narrower transverse dimension and being weighted at its narrow portion, said body member having an outrigger mounted thereon and movable with respect to said body to engage a line on either side thereof and having means for slidably receiving a line, and a spring clip mounted on the top of said body portion adjacent said outrigger, said spring clip and said outrigger engaging a line attached to said float, said spring clip frictionally engaging said line for automatically releasing said line when a predetermined force is applied thereto, said rear bobber section having a comparatively wider transverse section at its mid-portion than the forward section and having less height than the forward section of said float whereby said bobber section will ride high in the water and can be easily seen.

4. A trolling float comprising an elongated body member formed by irregular shaped forward and rear portions joined together by a vertically contracted waist portion, said forward portion constituting approximately two-thirds the length of the float and being formed with a depending portion intermediate its ends to which an arcuate shaped weight is attached in such a manner as to form a continuation of the curved surface thereof, the rear portion of the body being formed with tapered upper and lower transverse and longitudinally extending surfaces the former of which projects upwardly beyond the upper surface of the forward portion of the body, and an outrigger mounted on said body and movable with respect thereto to engage a line on either side thereof, said outrigger including means for slidably receiving a line, and a spring clip mounted on top of said body adjacent said outrigger, said spring clip and outrigger being adapted to engage a line attached to said float in such a manner that it will be automatically released from the spring clip when a predetermined force is applied thereto.

5. A trolling float as set forth in claim 4 wherein the outrigger includes a rod-like element frictionally slidable through said body member and a releasable eyelet clip at one end of said rod-like element.

6. A trolling float including an elongated body portion of two sections including a forward section carrying a deep keel and a rear section providing a bobber, said forward section comprising approximately two-thirds of the length of said float, said forward section tapering transversely of its longitudinal axis from an upper wider to a lower narrower transverse dimension and being weighted at its narrower portion, said body member including an outrigger mounted thereon and movable with respect to said body to engage a line on either side thereof and having means for slidably receiving a line, and a spring clip mounted on top of said body portion adjacent said outrigger, said spring clip and said outrigger engaging a line attached to said float, said spring clip frictionally engaging said line for automatically releasing said line when a predetermined force is applied thereto, said rear bobber section having a comparatively wider transverse section at its mid-portion than the mid-portion of said forward section and having less height than the forward section of said float whereby said bobber section will ride high in the water and can be easily seen, said forward section and said rear section being joined together by a vertically contracted waist portion.

References Cited in the file of this patent

UNITED STATES PATENTS

| | | |
|---|---|---|
| 1,081,837 | Jordan | Dec. 16, 1913 |
| 1,606,240 | Klaserner | Nov. 9, 1924 |
| 2,539,162 | Redding | Jan. 23, 1951 |
| 2,595,947 | Jones | May 6, 1952 |
| 2,608,017 | Hinkson | Aug. 26, 1952 |

FOREIGN PATENTS

| | | |
|---|---|---|
| 609,852 | Great Britain | Oct. 7, 1948 |